(12) United States Patent  (10) Patent No.: US 7,877,117 B2
Abhishek et al.  (45) Date of Patent: Jan. 25, 2011

(54) METHOD FOR MAINTAINING WIRELESS NETWORK RESPONSE TIME WHILE SAVING WIRELESS ADAPTER POWER

(75) Inventors: Abhishek Abhishek, Sammamish, WA (US); Anton W. Krantz, Kirkland, WA (US); Adeel Siddiqui, Redmond, WA (US); Igor A. Kostic, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 337 days.

(21) Appl. No.: 11/638,927

(22) Filed: Dec. 14, 2006

(65) Prior Publication Data

US 2007/0093231 A1  Apr. 26, 2007

Related U.S. Application Data

(63) Continuation of application No. 10/836,306, filed on Apr. 30, 2004, now Pat. No. 7,181,190.

(51) Int. Cl.
*H04B 1/38* (2006.01)

(52) U.S. Cl. .................................. 455/574; 455/181.1

(58) Field of Classification Search ................ 455/574, 455/127.5, 405, 414, 456.1, 453, 343.4
See application file for complete search history.

(56) References Cited

U.S. PATENT DOCUMENTS

| | | | |
|---|---|---|---|
| 5,375,254 A | 12/1994 | Owen | |
| 5,517,679 A | 5/1996 | Yahagi | |
| 5,594,737 A | 1/1997 | Pillekamp | |
| 5,596,318 A | 1/1997 | Mitchell | |
| 6,115,815 A | 9/2000 | Doragh et al. | |
| 6,192,230 B1 | 2/2001 | van Bokhorst et al. | |
| 6,289,464 B1 | 9/2001 | Wecker et al. | |
| 6,292,508 B1 | 9/2001 | Hong et al. | |
| 6,304,914 B1 | 10/2001 | Deo et al. | |
| 6,480,476 B1 | 11/2002 | Willars | |
| 6,549,517 B1 | 4/2003 | Aweya et al. | |
| 6,590,588 B2 | 7/2003 | Lincke et al. | |
| 6,604,149 B1 | 8/2003 | Deo et al. | |
| 6,609,157 B2 | 8/2003 | Deo et al. | |
| 6,691,236 B1 | 2/2004 | Atkinson | |
| 6,751,456 B2 | 6/2004 | Bilgic | |
| 6,763,239 B2 | 7/2004 | Huber et al. | |
| 6,870,890 B1 | 3/2005 | Yellin et al. | |

(Continued)

OTHER PUBLICATIONS

Examination Report dated Oct. 29, 2008 in European Application No. 05 103 488.2.

(Continued)

*Primary Examiner*—Tu X Nguyen
(74) *Attorney, Agent, or Firm*—Wolf, Greenfield & Sacks, P.C.

(57) ABSTRACT

To reduce the power consumption of a wireless communication hardware device, power conservation scheduling algorithms can be implemented. Reoccurring events, including DTIM intervals and listen intervals can be scheduled as awake times. Similarly expected response intervals can be scheduled as awake times based on information, such as round trip time, that can be passed together with data to be transmitted. The wireless communication hardware device can be placed into a doze state unless it is transmitting data, or unless it is expecting a transmission during one of the scheduled awake times.

20 Claims, 6 Drawing Sheets

U.S. PATENT DOCUMENTS

| | | |
|---|---|---|
| 6,944,687 B2 | 9/2005 | Doragh et al. |
| 6,965,763 B2 * | 11/2005 | Bussan et al. ............ 455/343.4 |
| 6,978,149 B1 | 12/2005 | Morelli et al. |
| 7,058,431 B2 * | 6/2006 | Sasaki .................. 455/574 |
| 7,263,078 B2 | 8/2007 | Krantz et al. |
| 7,340,615 B2 | 3/2008 | Krantz et al. |
| 7,451,331 B2 | 11/2008 | Krantz et al. |
| 7,460,502 B2 | 12/2008 | Arima et al. |
| 7,506,188 B2 | 3/2009 | Krantz et al. |
| 2001/0027494 A1 | 10/2001 | Deo et al. |
| 2002/0174371 A1 | 11/2002 | Padawer et al. |
| 2002/0184288 A1 | 12/2002 | Vargas et al. |
| 2003/0064744 A1 | 4/2003 | Zhang et al. |
| 2003/0117968 A1 | 6/2003 | Motegi et al. |
| 2003/0197597 A1 | 10/2003 | Bahl et al. |
| 2003/0198196 A1 | 10/2003 | Bahl et al. |
| 2003/0203740 A1 | 10/2003 | Bahl et al. |
| 2003/0210658 A1 | 11/2003 | Hernandez et al. |
| 2004/0003300 A1 | 1/2004 | Malueg et al. |
| 2004/0033812 A1 | 2/2004 | Matsunaga et al. |
| 2004/0076177 A1 | 4/2004 | Koch et al. |
| 2004/0103278 A1 | 5/2004 | Abhishek et al. |
| 2004/0120278 A1 | 6/2004 | Krantz et al. |
| 2004/0153676 A1 | 8/2004 | Krantz et al. |
| 2004/0172566 A1 | 9/2004 | Greiger et al. |
| 2004/0249988 A1 | 12/2004 | Williams et al. |
| 2004/0268159 A1 | 12/2004 | Aasheim et al. |

OTHER PUBLICATIONS

Part 11: Wireless LAN Media Access Control (MAC) and Physical Layer (PHY) Specifications, International Standard ISO/IEC 8802-11, ANSI/IEEE std. 802.11, 1999-00-00.

Native 802.11 Framework for IEEE 802.11 Networks; Windows Platform Design Notes—Design Information for the Microsoft® Windows® Family of Operating Systems; Mar. 26, 2003.

Chen et al., "A Rendezvous Reservation Protocol for Low Power Wireless Infrastructure,": 2002.

Anand, et al., "Self-Tuning Wireless Network Power Management," Department of Electrical Engineering and Computer Science University of Michigan, Sep. 14-19, 2003.

* cited by examiner

METHOD FOR MAINTAINING WIRELESS NETWORK RESPONSE TIME WHILE SAVING WIRELESS ADAPTER POWER

CROSS-REFERENCE TO RELATED APPLICATION

This Application is a Continuation of application Ser. No: 10/836,306, entitled METHOD FOR MAINTAINING WIRELESS NETWORK RESPONSE TIME WHILE SAVING WIRELESS ADAPTER POWER, filed on Apr. 30, 2004, which is herein incorporated by reference in its entirety.

FIELD OF THE INVENTION

This invention relates generally to wireless communication technology and, more particularly, relates to a system and method for reducing the power consumption of a wireless communication device while maintaining efficient wireless communication.

BACKGROUND

As wireless communication becomes more prevalent, many electronic device, especially mobile devices, provide a hardware interface for wireless communication. However, such wireless communication hardware often consumes a disproportionate amount of power, causing the mobile device to require frequent recharging. For example, the battery life of some mobile devices can be halved when using a wireless interface. Generally, efforts directed to decreasing the power consumption of wireless communication hardware have either sought to make the hardware more efficient, or have sought to minimize the amount of time the wireless hardware is in a full-power state.

Wireless communication hardware can enable a mobile device to communicate wirelessly in much the same way that the device would communicate over a wireless connection. Consequently, higher level communication applications, such as email applications, web browser applications, and the like, can use wireless communication just as they would wired communication. However, the device drivers and other software interfacing more directly with the wireless communication hardware can provide wireless-specific functionality to account for the differences between wireless and wired communications. In part, such wireless-specific functionality can be based on predefined standards specifically designed to facilitate wireless communication. Other wireless-specific functionality can include the ability to monitor and adjust wireless signal strength, the ability to provide and use location specific information, and the ability to provide power conservation.

When transmitting data, the higher level communication application can provide the data to lower level software without regard for whether wireless or wired communication is being used. The lower level software, can then prepare the data in the most appropriate manner for transmission via a wireless connection. Often, the lower level software comprises multiple layers. For example, one layer, sometimes referred to as a "transport driver" or a "protocol driver", can order the data being sent by the higher level application into packets appropriate for a particular network transmission protocol, and can apply headers to each of the packets as called for by the protocol. A further layer, sometimes referred to as an "intermediate driver", can then provide high level device driver functionality, such as packet filtering or load balancing across multiple physical interfaces. To aid in the development of software to control the network interface hardware itself, a still further layer, sometimes referred to as a "miniport driver" can abstract common functionality. Such a miniport driver can provide functionality common to a particular interface, such as a wireless interface conforming to a particular wireless standard. The miniport driver, in combination with a still further layer, sometimes referred to as a "microport driver", can provide the necessary control instructions to physically control the communication hardware in order to transmit the data sent by the higher level communication application.

Data that is to be received by the higher level communication application can follow a similar path, except in reverse. Thus, incoming data packets destined for the higher level communication application can be received by the network communication hardware and detected by the miniport/microport driver combination. They can subsequently be passed to the intermediate driver, and then to the transport driver, which can ultimately present the data stream to the higher level communication application. Consequently, because hardware-specific functionality is generally only implemented at the miniport/microport driver layer, efforts at reducing the power consumption of wireless communication hardware have generally been implemented at this level and have exclusively relied on information that can be extrapolated at this level.

Other efforts at reducing the power consumption of wireless communication hardware have been focused on the hardware itself, such as by creating efficient "low-power" states that can listen for appropriate communication, but cannot transmit, thereby reducing power consumption. One difficulty with both of these approaches is that neither of them seek to minimize power consumption from an overall communication system standpoint. For example, while the power consumption of wireless communication hardware can be reduced via the use of low-power states, such states can never be as efficient as a sleep state, in which the hardware neither sends or receives information. However, a hardware solution, by itself, cannot implement such a sleep state, because the hardware can never know when it might need to receive information. Similarly, while the power consumption of wireless communication hardware can be reduced by monitoring the information that can be derived at the lowest driver layers, such information generally does not provide any indication regarding future expected communication, limiting the amount of power consumption that can be saved.

BRIEF SUMMARY OF THE INVENTION

Embodiments of the invention allow device drivers and other lower level communication software to implement a schedule and thereby control wireless communication hardware to minimize the amount of time that the hardware needlessly operates in a full power mode.

In an embodiment, the wireless communication hardware can be awakened at predefined intervals to operate in a full power mode, and can also be scheduled to be awakened when a response is expected to a prior transmission.

In another embodiment, transport drivers, protocol drivers, or similar protocol-specific software can provide to miniport drivers, or similar lower level device drivers, a round-trip time, which can be used to schedule when the wireless communication hardware is to be awakened.

In a further embodiment, a timer array can be used to implement a timer wheel to track, to a predefined temporal granularity, the scheduled awake periods of the wireless communication hardware.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
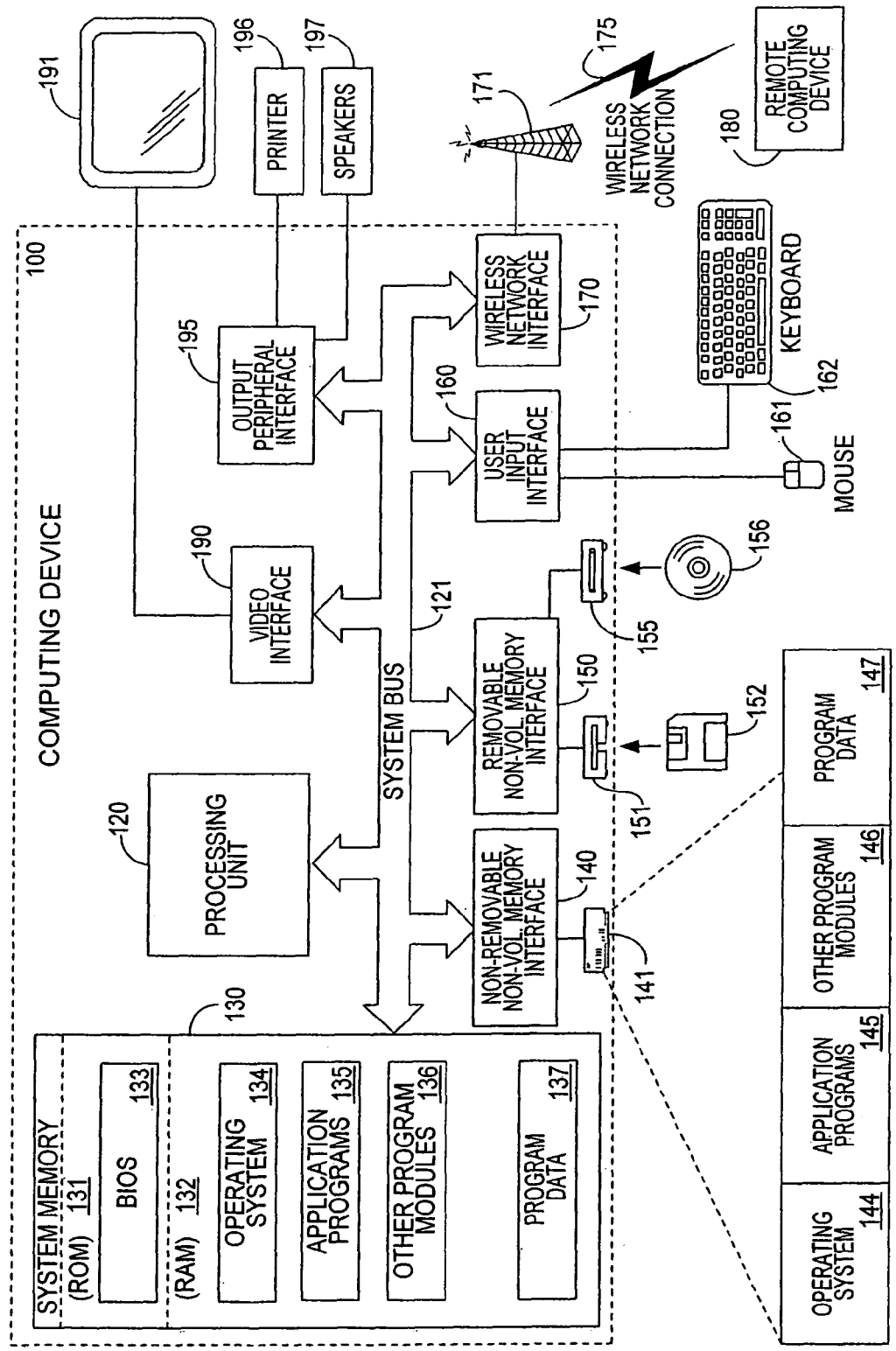
FIG. 1 is a block diagram generally illustrating an exemplary device architecture in which embodiments of the present invention may be implemented.

Wireless communications are often utilized by mobile computing devices because the benefits of unrestricted mobility are most useful to a mobile computing device. Unfortunately, mobile computing devices are the often the least able to source the necessary power used by wireless communication hardware. Furthermore, because of the nature in which mobile computing devices are often used, reduced power consumption by wireless communication hardware enables a mobile computing device to operate, even in a networked mode, for a longer period of time, making such a device that much more useful to the user.

While prior attempts have been made to reduce the power consumption of wireless communication hardware, such attempts generally focused on only one aspect of wireless communication, such as the hardware, or the device drivers on an individual basis. Embodiments of the present invention, however, seek to reduce the power consumption of wireless communication hardware by focusing on the overall communication system. Consequently, round trip time and similar values determined by higher level protocol-specific software can be passed to lower level device drivers to schedule a time at which the wireless communication hardware can be awakened and placed in a full power state. In addition to such information, regularly scheduled listen intervals and Delivery Traffic Indication Message (DTIM) intervals can also be used to schedule a time at which the wireless communication hardware can be awakened and placed in a full power state. When the wireless communication hardware is not in a full power state, it can be placed in a doze mode, or similar low power state, during which only a minimum of power is consumed as the hardware is generally not able to send or receive information. In such a manner, the overall power consumption of the wireless communication hardware can be reduced, while maintaining a responsive connection, allowing the user of a mobile device to use the device for a longer period of time without sacrificing communication speed.

Although not required, the invention will be described in the general context of computer-executable instructions, such as program modules, being executed by a computing device. Generally, program modules include routines, programs, objects, components, data structures, and the like that perform particular tasks or implement particular abstract data types. In distributed computing environments, tasks can be performed by remote processing devices that are linked through a communications network. In a distributed computing environment, program modules may be located on both local and remote computer storage devices and/or media Those skilled in the art will appreciate that the invention may be practiced with many different computing devices, either individually or as part of a distributed computing environment, where such devices can include hand-held devices, multi-processor systems, microprocessor based or programmable consumer electronics, network PCs, minicomputers, mainframe computers, and the like.

Turning to FIG. 1, an exemplary computing device 100 on which the invention may be implemented is shown. The computing device 100 is only one example of a suitable computing device and is not intended to suggest any limitation as to the scope of use or functionality of the invention. Furthermore, the computing device 100 should not be interpreted as having any dependency or requirement relating to any one or combination of peripherals illustrated in FIG. 1.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices can be connected to the processing unit 120 through a user input interface 160 that is coupled to the system bus, or may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment using logical connections to one or more remote computers. FIG. 1 illustrates a wireless network connection 175 to a remote computing device 180. The wireless network connection 175 can be any of various different types of wireless networks and wireless network connections, including a Wireless Local Area Network (WLAN), a Wide-Area Network (WAN), networks conforming to the Ethernet protocol, or other logical or physical wireless networks including elements of the Internet or the World Wide Web. Similarly, the remote computing device 180, can be another computing device similar to computing device 100, or it can be a wireless base station, or other wireless access point, which may have some or all of the elements of computing device 100 described above.

When used in a networking environment, the computing device 100 is connected to the wireless network connection 175 through a network interface or adapter, such are the wireless network interface 170, and the wireless hardware 171. The wireless network interface 170 can be any collection of software components and applications, including device drivers, protocol stacks and the like. The wireless network interface can also implement a layered software architecture, such as the one described in detail below. The wireless hardware 171 can be a stand-alone unit or can be integrated into the computing device 100, such as an expansion card conforming to any of a number of protocols. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
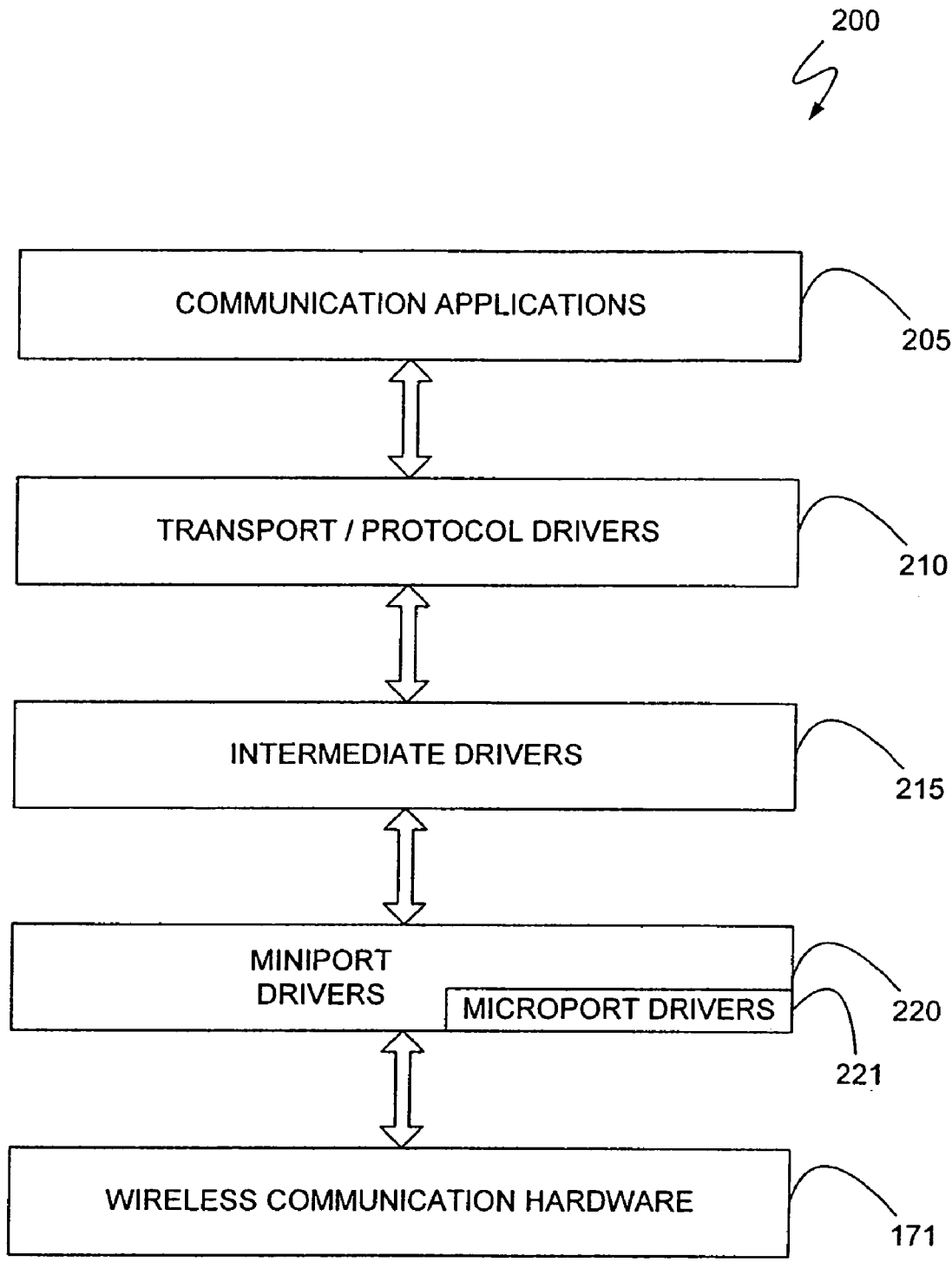
FIG. 2 is a block diagram generally illustrating an exemplary layered communication system with which embodiments of the present invention may be implemented.

Turning to FIG. 2, a layer diagram is shown illustrating one communication architecture contemplated by an embodiment of the present invention. At a top level of the communication architecture 200 are the communication applications 205 that can be the ultimate consumers and producers of the data that is being transmitted across the wireless network 175. As such, most transmissions of data will originate with the communication applications 205 and most receipt of data will terminate with them. Consequently, they are illustrated at the top of the communication architecture 200. Communication applications 205 can include web browsers, email clients, network utilities, or similar applications that rely on, or can make use of, network communication.

In the communication architecture 200, a level below the communication applications 205 can be the transport drivers 210. In some communication architectures, the transport drivers are conceptualized in the same layer as the protocol drivers, while other architectures may separate the two. Generally, the transport and/or protocol drivers 210 can implement a protocol stack, such as, for example, the ubiquitous Transmission Control Protocol/Internet Protocol (TCP/IP) stack, or the Internetwork Packet Exchange/Sequenced Packet Exchange (IPX/SPX) stack. Transport drivers and protocol drivers can allocate packets, apply appropriate packet header information, copy data from the sending application into the packet, and send packets to lower levels. Transport drivers and protocol drivers can also provide interfaces to receive incoming packets from the next lower level driver and transfer received data to the appropriate client application.

Below the transport drivers and the protocol drivers 210, in the communication architecture 200, can be the intermediate drivers 215. Intermediate drivers can provide high level device driver functionality, which can include translating between different network media, filtering packets, and balancing packet transmission across more than one network interface. For example, an intermediate driver can allow the communication applications 205 to use a compatible protocol in layer 210 and can then translate the packets generated by layer 210 into appropriate packets for transmission on the particular network to which the computing device 100 is actually connected, even if that network uses a different protocol. Similarly, an intermediate driver can filter packets, such as by performing packet scheduler functions. A packet scheduler can read priority information in packets, and can then schedule each packet for transmission or reception based on its priority.

The intermediate driver layer 215 can exchange data with miniport drivers 220, as shown in FIG. 2. The miniport drivers 220 can, either by themselves or in combination with the microport drivers 221, act as the lowest software layer of the communication architecture 200. In some architectures, a miniport driver implements all of the hardware-specific functionality required by the physical networking hardware, such as wireless communication hardware 171. In other architectures, a miniport driver can abstract some device specific functionality, instead focusing on functionality that would be common to particular types of communication devices, such as all wireless communication devices. In such a case, a microport 221 can provide the device specific functionality to control the particular device. For simplicity, the communication architecture 200 of FIG. 2 illustrates the miniport 220 and the microport 221 as a singular layer that can provide device specific control. The functionality provided by the miniport 220, or the miniport 220 in combination with the microport 221, can include the forwarding of packets to the wireless communication hardware 171 for transmission, the retrieval of received packets from the wireless communication hardware, the handling of interrupts, and like hardware control operations.

One standardized communication architecture similar to the communication architecture 200 described above is known as the Network Driver Interface Specification (NDIS). As will be known by those skilled in the art, NDIS defines the communication pathways between the various layers illustrated in FIG. 2. Thus, for example, NDIS defines the functions that the intermediate driver can provide support for, standardizing the calls in such a manner that any transport driver that uses those calls will be able to utilize the functionality of the intermediate driver.

One miniport driver 220 contemplated by an embodiment of the present invention provides power conservation scheduling for the wireless communication hardware 171. Such scheduling can enable the wireless communication hardware to remain in an awake mode for only predetermined intervals, and otherwise allow the wireless communication hardware to operate in a doze mode to conserve power. While individual wireless hardware devices may implement different power modes, an awake mode, as contemplated by an embodiment of the present invention, can refer to any power mode of the wireless hardware device in which the device can send and/or receive information. Thus, for example, some wireless hardware devices may only implement a few power modes, and an awake mode may only be a full power mode. However, other wireless hardware devices may implement a continuum of different power modes, and an awake mode may not necessarily entail a full power mode, but can be any lower power mode as well, provided that such a lower power mode is sufficient to reliably send and receive information. Similarly, a doze mode, as contemplated by an embodiment of the present invention, can refer to any power mode of the wireless hardware device in which the device is conserving power by turning off, or otherwise suspending, its ability to send and/or receive information but yet retaining the ability to resume sending or receiving in an efficient manner. Thus, for example, some wireless hardware devices may only implement a few power modes, and a doze mode may only be a no power mode. However, other wireless hardware devices may implement a continuum of different power modes, and a doze mode may not necessarily entail a no power mode, but can be any power mode that is designed to conserve power by suspending the device's ability to send and receive information. For devices that do implement a continuum of different power modes, one difference between various low power modes can be the speed with which the device can be restored to a fill power mode. In such a case, embodiments of the present invention contemplate the use of a power conservation mode that allows the device to be restored to a full power mode as quickly as possible. However, as indicated above, a doze mode, as used herein, can refer to any power mode of the wireless hardware device in which the device is conserving power by suspending its ability to send and/or receive information.

To provide the miniport driver 220 with information that can be used to implement an efficient schedule for the wireless communication hardware 171, one embodiment of the present invention contemplates that information, such as the round trip time, can be determined by protocol and/or transport driver 210, or similar higher level communication software, and can be passed to the miniport driver 220. If round trip time, and similar information, is not available, default values can be used. The default values can further be configurable to enable the scheduling implemented by the miniport driver 220 to adapt to the observed impact of the scheduling on communication performance.

Information can be passed from the protocol and/or transport driver 210 to the miniport driver 220 via any known message passing algorithm. For example, the standardized NDIS architecture can be extended to provide specific interfaces for passing scheduling information, such as round trip time, form the protocol and/or transport driver 210 to the miniport driver 220. In a system in which the wireless communication hardware 1 and the miniport driver 220 operate using the known IEEE 802.11 wireless communication standard, the scheduling information can be passed as out of band (OOB) data with each MAC Service Data Unit (MSDU) that is sent to the miniport driver.

As indicated above, the scheduling information can be used by the miniport driver 220 to implement a power conservation schedule for the wireless communication hardware 171. One power conservation schedule contemplated by an embodiment of the present invention calls for the wireless communication hardware to be awakened at predefined intervals to receive DTIM messages. As will be known by those skilled in the art, a DTIM message can provide an indication to the wireless communication hardware 171 that a broadcast or multicast message is waiting for it at an access point, such as a wireless base station. The interval between DTIM messages can be determined, for example, via a handshaking procedure between the wireless communication hardware 171 and a wireless access point with which the hardware 171 is communicating. Alternatively, the DTIM interval can be manually determined by the user, or can be a predetermined default value. The DTIM interval can also be varied to accommodate variances in the wireless network. To provide for power conservation scheduling, the miniport driver 220 can use a function, such as the one described in detail below, to specify a future time to awaken the wireless communication hardware 171 and provide an indication that the reason for awakening the hardware 171 was to receive a DTIM message.

In a similar manner to that described above, an additional power conservation schedule contemplated by an embodiment of the present invention calls for the wireless communication hardware to be awakened at predefined intervals to receive messages that may be specifically addressed to the computing device 100 using the wireless communication hardware 171. As will be known by those skilled in the art, such predefined intervals can be referred to as "listen intervals". As with DTIM intervals, listen intervals can be determined, for example, via a handshaking procedure between the wireless communication hardware 171 and a wireless access point with which the hardware 171 is communicating. Similarly, the listen interval can be manually determined by the user, or it can be a predetermined default value, or it can be varied to accommodate variances in the wireless network. To provide for power conservation scheduling, the miniport driver 220 can use a function, such as the one described in detail below, to specify a future time to awaken the wireless communication hardware 171 and provide an indication that the reason for awakening the hardware 171 was due to the listen interval.

While awakening the wireless communication hardware at reoccurring intervals, such as the DTIM and listen intervals described above, can provide a measure of power conservation, a further power conservation schedule contemplated by an embodiment of the present invention calls for the wireless communication hardware to be awakened in time to receive an expected response to previously transmitted data. As indicated above, information, such as the round trip time, can be determined by protocol and/or transport driver 210, or similar higher level communication software, and can be passed to the miniport driver 220. Such information can then be used to set a power conservation schedule such as, for example, by placing the wireless communication hardware into a doze mode for some of the duration of the round trip time.

Figure 3:
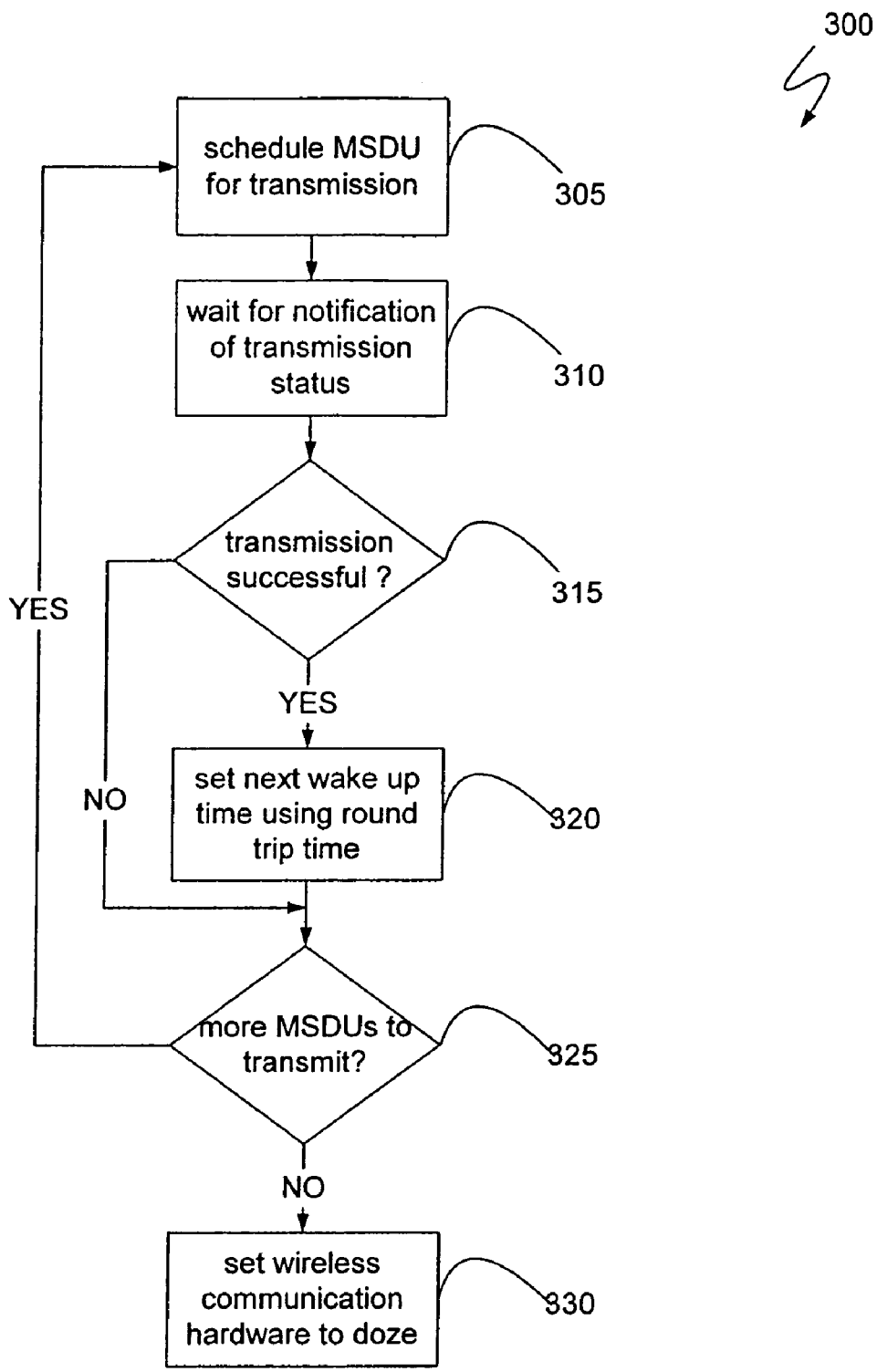
FIG. 3 is a flow diagram generally illustrating an algorithm for transmitting information according to an embodiment of the present invention.

Turning to FIG. 3, an algorithm 300 is shown which generally illustrates an algorithm for setting a power conservation schedule contemplated by an embodiment of the present invention. While the description that follows will refer to the implementation of algorithm 300 by the miniport driver 220, other software drivers, including drivers that may not conform to the communication architecture 200, can similarly implement the algorithm 300.

As indicated, algorithm 300 can begin at step 305 when the miniport driver 220, having received data to be transmitting by the wireless communication hardware 171, can schedule the transmission of an MSDU. An MSDU, as will be known by those skilled in the art, can be a chain of one or more MAC Protocol Data Units (MPDUs). The wireless communication hardware 171 can then attempt to transmit the MSDU at the scheduled time. As shown in step 310, the miniport driver 220 can wait for a response from the wireless communication hardware 171 that can indicate the transmission status of the MSDU. If, at step 315, the wireless communication hardware 171 indicates that the transmission was not successful, execution can skip to step 325, which can indicate that at least one MSDU remains to be transmitted, and execution can return to step 305 to attempt transmission of the MSDU a subsequent time. If, however, at step 315, the wireless communication hardware 171 indicates that the transmission was successful, the miniport driver 220 can schedule a next wake up time for the hardware 171 based on, for example, the round trip time associated with the MSDU.

As explained above, information, such as the round trip time, can be passed as OOB information together with the MSDU from the transport/protocol driver 210 to the miniport driver 220. Such information can be used by the miniport driver 220 to schedule the next wake up time. For example, if a round trip time is indicated to be 100 ms, then the miniport driver 220 can schedule a next wake up time in 100 ms so that the wireless communication hardware 171 can be awake when the response to the currently transmitted MSDU arrives. Alternatively, information other than simply the round trip time can be passed to the miniport driver 220 to be used in establishing a power conservation schedule. For example, an indication of network congestion, hardware status, and like information, can also be used to either set a next wake up time, or to adjust a next wake up time based on a round trip time.

The miniport driver 220 can schedule the next wake up time via a function, such as that described in detail below, that can enter scheduling information into an timer array, or similar structure. Once the miniport driver 220 has completed the scheduling of the next wake up time, as indicated at step 320, the miniport driver can check if there are any further MSDUs that require transmission at step 325. If there are additional MSDUs to be transmitted, execution can return to step 305 and the miniport driver 220 can attempt to transmit a subsequent MSDU in the manner described. However, if there are no further MSDUs for transmission, the miniport driver 220 can set the wireless communication hardware 171 into a doze mode, as indicated at step 330.

Figure 4:
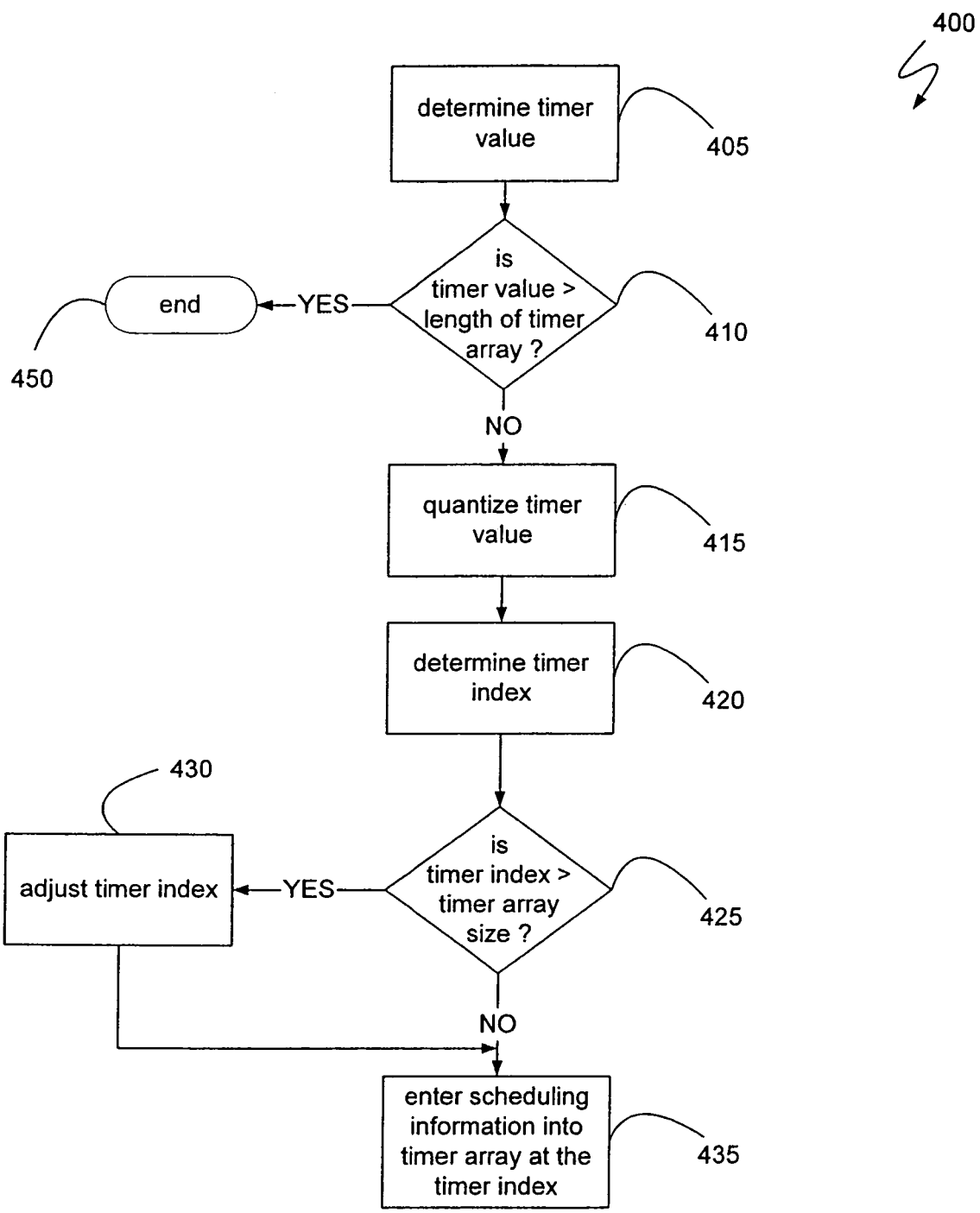
FIG. 4 is a flow diagram generally illustrating an algorithm for setting a timer index according to an embodiment of the present invention.

Turning to FIG. 4, an algorithm 400 is shown for scheduling a next wake up time contemplated by an embodiment of the present invention. The algorithm 400 can operate to determine an appropriate entry in a timer array, and store information into that entry, which can be used to awaken the wireless communication hardware 171, such as by using the mechanism described in further detail below. As will be known by those skilled in the art, a timer array can be an array data structure, where each subsequent entry is read from the array at predefined time intervals. Consequently, information that is intended to be accessed after a defined period of time can be stored in a particular array entry that is sufficiently distant, within the array, from the current entry. As will also be known by those skilled in the art, a timer array is not infinite. Once the end of the array is reached, the next entry that is read is generally the first entry, which can allow the array to be used for extended periods of time. However, because the order in which entries are accessed eventually loops back on itself, a timer array can only schedule events within a certain time frame, and more distant events cannot be scheduled until a later time.

The algorithm 400 presents one mechanism by which the miniport driver 220, or other software, can enter power conservation scheduling information into a timer array. An initial step 405 can determine a "timer value", which can be the next wake up time, as determined by one of the above described methods, taking into account an appropriate safety margin. As it is generally not useful for wireless communication hardware to awaken after it was to have received information, the power conservation scheduling information can seek to awaken the hardware prior to an anticipated event. Furthermore, because it may not be practical to determine the exact amount of time elapsed in performing scheduling procedures, a safety margin can be used to account for any such time variances. For example, if a round trip time is indicated to be 100 ms, a next wake up time can be determined, using the above described methods, to be 100 ms from the time when the packet was transmitted by the wireless communication hardware. However, the algorithms for setting a next wake up time, such as algorithm 400, may require 10-15 ms to execute. Consequently, if the wireless communication hardware was awakened 100 ms after the completion of the scheduling algorithms, it would likely be awakened 10-15 ms too late, and would likely have missed the expected response.

To avoid monitoring the exact amount of time elapsed in performing scheduling procedures, the timer value determined at step 405 can include an appropriate safety margin. For example, if the next wake up time was indicated to be 100 ms, as above, and the scheduling algorithms may require 10-15 ms to execute, a safety margin of 20 ms can be used. Consequently, given a next wake up time of 100 ms, the timer value can be determined to be 80 ms from the present. Including the time taken to execute the various algorithms, the wireless communication hardware would likely awaken 90-95 ms after transmitting a packet, allowing it to receive a response that would be expected to arrive 100 ms after the initial transmission.

Once a timer value is determined at step 405, such as by using the above described methods, it can be verified that the determined timer value is within the range of the timer array. Thus, at step 410, the timer value can be compared to the length, in time, of the timer array. If the timer value exceeds the length, in time, of the timer array, the timer array cannot be used to schedule the event at the timer value and the algorithm ends at step 450. However, if the timer value is less than the length, in time, of the timer array, the timer value can be quantized, as appropriate for the timer array, at step 415.

As will be appreciated by those skilled in the art, since a timer array is not infinite, it can only provide discrete, as opposed to continuous, time measurement. Consequently, it can be necessary to quantize any event that is to be scheduled using the granularity of the timer wheel. Because, as indicated above, it is generally not useful for wireless communication hardware to awaken after it was to have received information, the quantizing of a timer index at step 415 can insure that it is not scheduled for a time that is later than the scheduled time. For example, if a timer array is implemented with a granularity of 25 ms, and the timer value is 80 ms, as above, a quantized timer value can be 75 ms, as that would be the time represented by the last array entry prior to the timer value of 80 ms.

Once the quantized timer value is obtained at step 415, a timer index can be determined at step 420. As indicated above, the timer value represents a duration from a current time in which an event is scheduled. Thus, in the above example, the timer value of 80 ms indicates that an event is to be scheduled for 80 ms from the present time. Therefore, to determine a timer index, the quantized timer value can be converted to an appropriate index value and can be added to a current time index. For example, if the timer array is implemented with a granularity of 25 ms, and the quantized timer value is 75 ms, as above, the quantized timer value can be expressed as 3 array entries (or 75 ms) from the present time. If the current time index, or the current array entry that is being processed, is array entry 64, then the timer index, as computed at step 420 can be 64+3 or 67.

As will be known by those skilled in the art, step 415 and 420 can be performed together in an efficient manner by using the DIV function. Specifically, a timer value can be divided, using the DIV function, by the granularity of the timer array, and can then be added to the current time index to calculate a timer index. Using the above example, the timer value of 80 ms divided, using the DIV function, by 25 ms results in a value of 3, which can then be added to the current time index of 64 to calculate a timer index of 67.

Once the timer index is determined at step 420, step 425 can ensure that the determined timer index is not greater than the upper bound of the timer array. If the timer index is less than the upper bound of the timer array, appropriate information can be stored at that timer index at step 435, which will be described in detail below. However, if the timer index is greater than the upper bound of the timer array, step 430 can adjust the timer index appropriately. Specifically, as described above, the timer array is processed in a circular manner, such that after the last entry in the array is processed, processing returns to the first entry. Thus, the timer array represents a continually moving window of time, as opposed to a static duration. To account for such circular processing, timer indices that have a greater absolute value than the largest index value in the timer array can be adjusted so that they are processed at the correct time. For example, if a timer array contains 100 elements, numbered by indices 0 to 99, and index 99 is currently being processed, then the next index to be processed will be 0.

One simple mechanism that can be used at step 430 to adjust the timer index is the well known MOD function, which can return the remainder of a division action. Specifically, the timer index determined at step 420 can be divided, using the MOD function, by the length of the timer array, and the result can be the adjusted timer index. For example, if the timer array had 100 elements, as above, and the timer index was 102, then performing the division, using the MOD function, results in a value of 2, which can be the adjusted timer index. If index entry 99 was currently being processed, an adjusted timer index of 2 indicates that the scheduled event will be processed in 3 timer array entries, namely after completion of the processing of index entry 99, index entries 0 and 1 will be processed prior to processing of the adjusted timer index of 3. The distance between the current time index of 99 and the timer index of 102 is thus equivalent to the distance between the current time index of 99 and the adjusted timer index of 2.

Once the timer index has been adjusted at step 430, if necessary, scheduling information can be entered into the appropriate timer index at step 435. As described above, there can be many types of wake up events scheduled. For example, a DTIM wake up event, a listen interval wake up event, and an expected response wake up event can all be scheduled using the above described algorithms. In addition to an indication of the type of event, the appropriate timer index can also indicate that the wireless communication hardware is to be awake during the time represented by the index. Such an indication need be nothing more than a single bit, where 0 can indicate that the wireless communication hardware can remain in a doze mode and where a 1 can indicate that the hardware can be in an awake state.

As will be recognized by those skilled in the art, the timer array can be maintained by the miniport driver 220, or other lower level communication software, and can be implemented in such a manner that the length, in time, of the array is greater than any reoccurring interval, such as the DTIM interval or the listen interval. To the extent that such intervals may change, the timer array can similarly be dynamically modified to accommodate the changed intervals.

Figure 5:
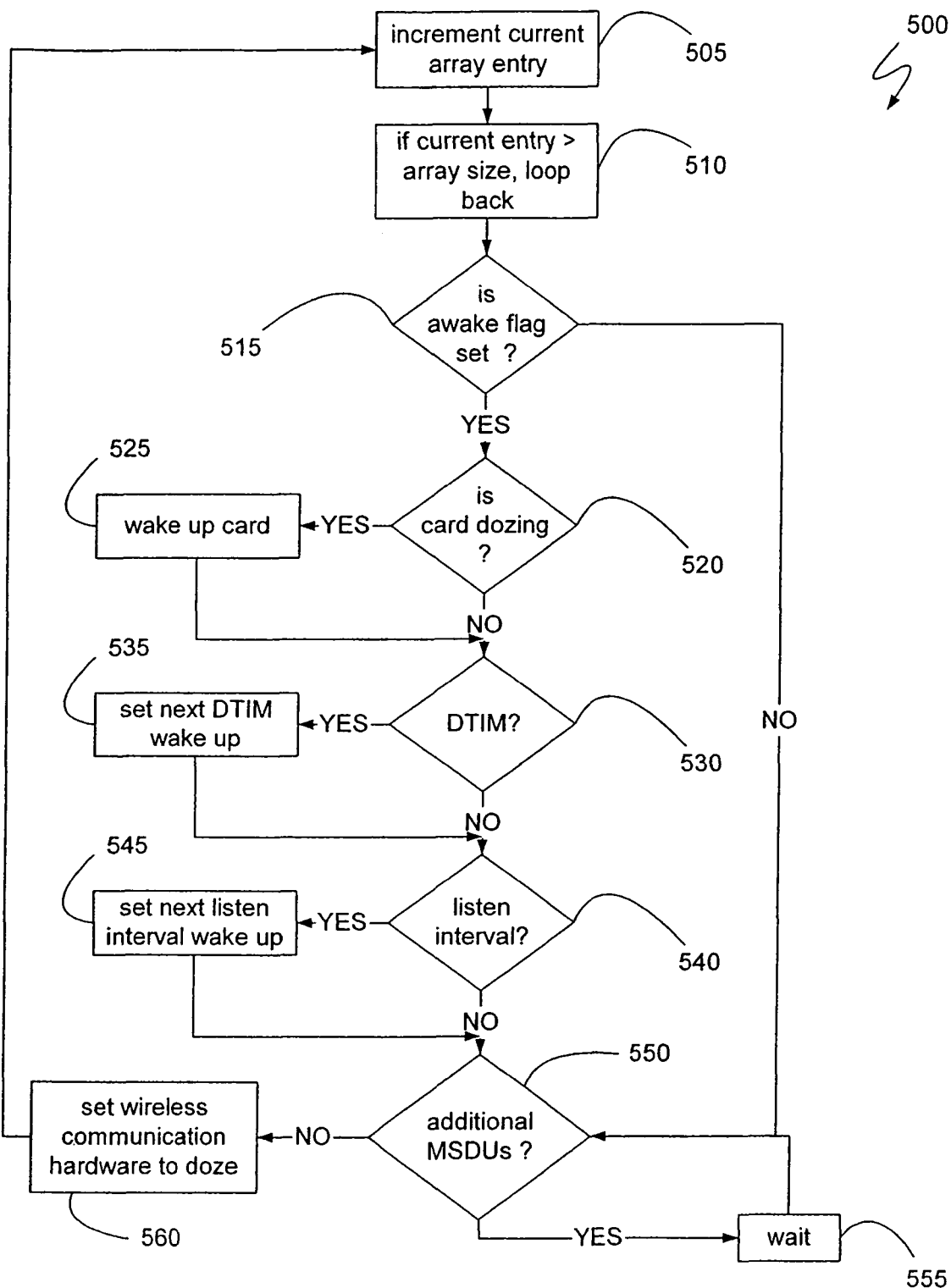
FIG. 5 is a flow diagram generally illustrating an algorithm for processing an entry in a timer array according to an embodiment of the present invention.

Turning to FIG. 5, an algorithm 500 is shown illustrating the processing of each entry in the timer array as contemplated by an embodiment of the present invention. Initially, at step 505, the current array entry value can be incremented by one to move the processing to the next array entry. Because, as explained above, a timer array can be implemented to loop back when the end of the array is reached, step 510 can check to determine whether the incremented array entry value exceeds the array's length and should be reset to the beginning of the array. If it does, step 510 can perform a division, using the MOD function in the manner described above, to reset the incremented array entry back to the beginning of the timer array.

After the proper array entry value has been determined, the algorithm 500 can determine whether the wireless communication hardware is supposed to be awakened at step 515, such as by checking an awake bit or flag. If the wireless communication hardware does not need to be awakened, execution can skip to step 550, which will be described in detail below. However, if the awake bit or flag at the current array entry indicates that the wireless communication hardware does need to be awake, then the algorithm 500 can check if the hardware is already awake at step 520. If the wireless communication hardware is in a doze mode, and needs to be placed into an awake mode, it can be awakened at step 525. Otherwise, execution can continue to step 530.

Once the wireless communication hardware is awake, the algorithm 500 can determine if any further scheduling is required. As explained above, the wireless communication hardware can be awakened for at least three different reasons. If the wireless communication hardware is awakened because information, such as the round trip time, indicated that an expected response should be received, then there may not be any further scheduling, and the hardware can simply remain awake until the expected response is received, or until it is placed in a doze state. However, if the wireless communication hardware is awakened because it needs to check for DTIM messages or because of the listen interval, then the algorithm 500 can also schedule the next DTIM message check or the next listen interval, since both can be events that reoccur at predetermined intervals, as described in detail above.

Consequently, at step 530, a check can be performed to determine if the indication to place the wireless communication hardware in an awake state was due to the expiration of a DTIM interval. Such a check can be made by checking a wake up field, or similar information store maintained in conjunction with the current timer array entry, which can indicate whether the wake up was scheduled as a result of a DTIM interval, a listen interval, an expected response, or some other reason. If it is determined that the wake up was scheduled due to the expiration of a DTIM interval, step 535 can schedule a subsequent DTIM wake up based on the DTIM interval, using a scheduling algorithm, such as that illustrated in FIG. 4, and described in detail above. If step 530 determines that the wake up was not due to the expiration of a DTIM interval, execution can proceed to step 540, which can check if the wake up was due to the expiration of a listen interval. If it is determined that the wake up was scheduled due to the expiration of a listen interval, step 545 can schedule a subsequent listen interval wake up based on the listen interval, using a scheduling algorithm, such as that illustrated in FIG. 4, and described in detail above.

If, at step 540, it is determined that the wake up was not due to the expiration of a listen interval, execution can proceed to step 550, which can check for any remaining MSDUs that may need to be transmitted, including transmission as described by the algorithm illustrated in FIG. 3, and described in detail above. If any remaining MSDUs do need to be transmitted, the algorithm 500 can wait for their transmission at step 555. If, however, there are no remaining MSDUs to be transmitted, the wireless communication hardware can be placed in a doze mode at step 560, and the execution can return to step 505 for processing a subsequent timer array entry.

Figure 6A:
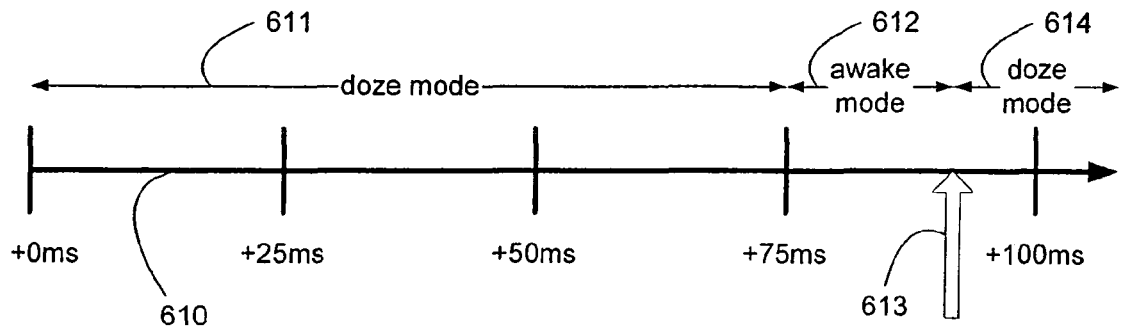
FIGS. 6a through 6c are timeline diagrams generally illustrating exemplary implementations of an embodiment of the present invention.

Turning to FIG. 6a, an exemplary operation of the above described algorithms is illustrated with respect to timeline 610. A timer array, such as that described in detail above, can indicate that a wake up flag is set for a time 75 ms from a current time. Consequently, the wireless communication hardware can be in a doze mode during the period 611. At a time 75 ms from the current time, the wireless communication hardware can enter an awake state and can maintain that awake state during the period 612, as illustrated. A data transmission, which can include DTIM messages, messages related to the listen interval, or expected response messages, can be received at time 613. In such a case, the wireless communication hardware could simply remain awake until the next timer array entry at, for example, 100 ms from the present. However, to conserve power more effectively, the wireless communication hardware can be returned to a doze mode during the period 614 immediately proceeding the receipt of the data transmission occurring at time 613. As can be seen from the timeline illustration shown in FIG. 6a, the wireless communication hardware can save power by being maintained in a doze state and being in the awake state only for a short amount of time needed to receive a data transmission.

Figure 6B:
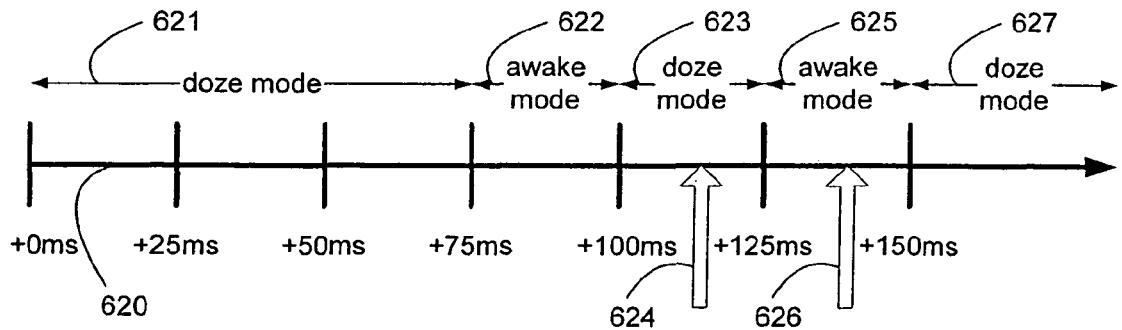

In some cases, however, the data transmission, such as data transmission 613 may occur at an unexpected time, and the wireless communication hardware may not be in an awake state to receive the data transmission. In such a case the data transmission can be temporarily stored at a base station or similar transmitting source, and the wireless communication hardware can be notified of the transmission and can receive the transmission as part of a routine check, such a check that occurs every listen interval. Turning to FIG. 6b, such a situation is illustrated on timeline 620. As shown in FIG. 6b, the wireless communication hardware can be in a doze state during the period 621 and can be awakened for an anticipated event, such as an expected response, during the period 622. However, having not received anything, the wireless communication hardware can be returned to a doze state for period 623 in order to conserve power Unfortunately the expected response may arrive at time 624, while the wireless communication hardware is in a doze state. In such a case the expected response may not be received at time 624 but can be received at a subsequent time, such as at time 626 when a check is made at a listen interval to detect any data that may be waiting for delivery to the wireless communication hardware. As indicated the wireless communication hardware can be in an awake state during period 625 because, for example, the timer array indicated the need to wake up the hardware to perform a listen interval check.

Figure 6C:
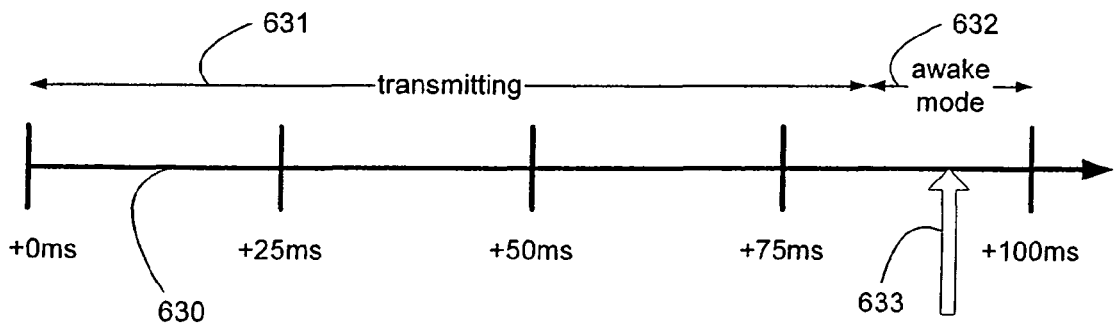

If the wireless communication hardware is in the process of transmitting information, and the transmission continues into a period of time during which the hardware should be awake to receive an expected transmission, the hardware can remain in an awake state. Turning to FIG. 6c, as shown on timeline 630, the wireless connection hardware can be awake and transmitting information during the period 631, which can extend past a time, such as the 75 ms marker, at which the hardware should have been awakened to receive the expected transmission. Consequently, even though the wireless communication hardware has completed its transmissions, it can remain awake for period 632 in order to receive the transmission at time 633. Therefore, while step 330 of FIG. 3 indicates that the wireless communication hardware may be placed in a doze mode, the algorithm of FIG. 3 can interoperate with the algorithm of FIG. 5 such that the wake up instruction of step 525 enables the hardware to remain in an awake state.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Similarly, many of the results achieved by the described algorithms can be achieved by algorithms having one or more different steps. Therefore, the invention as described herein contemplates all such embodiments as may come within the scope of the following claims and equivalents thereof.

What is claimed is:

1. A method for conserving power consumed by wireless communication hardware of a computing device executing a communication application, the method comprising the steps of:
   receiving a packet for transmission from higher level software comprising the communication application;
   receiving, along with the data for transmission, through the driver scheduling related information from a plurality of sources, wherein the plurality of sources comprise the communication application and the wireless communication hardware, wherein the scheduling related information can be used to determine an expected response time for receiving an expected response related to the received packet for transmission, and wherein the driver comprises a data structure;
   receiving information on at least one reoccurring event through interaction with at least one other wireless computing device;
   transmitting the packet for transmission using the wireless communication hardware;
   scheduling an awake state of the wireless communication hardware at a plurality of times by entering into the data structure a time value for each of the plurality of times, the plurality of time values comprising a time value based on the at least one reoccurring event and a time value based on the expected response time;
   placing the wireless communication hardware into a doze state; and
   in the doze state, processing entries of the data structure at a plurality of times, wherein the processing comprises:
   determining whether an entry in the data structure indicates a time of a scheduled awake state matching a current time,
   when a processed entry in the data structure indicates a time of a scheduled awake state matching a current time, placing the wireless communication hardware into the awake state at the scheduled time, and
   when the processed entry in the data structure does not indicate a time matching a current time, causing the wireless communication hardware to remain in the doze state.

2. The method of claim 1, wherein the data structure comprises a timer array and wherein scheduling the awake state at a time of the plurality of times comprises: entering scheduling information comprising an awake indicator into the timer array at a distance from a beginning of the time array corresponding to the scheduled time.

3. The method of claim 2, further comprising: when a processed entry in the data structure includes the time value indicative of the awake state based on the reoccurring event, scheduling the awake state of the wireless communication hardware based on the reoccurring event.

4. The method of claim 2, further comprising: placing the wireless communication hardware into a doze state if a transmission expected to be received during the awake state was received.

5. The method of claim 1, wherein the time value based on the expected response time comprises a time value based on the expected response time and a safety margin.

6. The method of claim 2, wherein the scheduling information comprises:
   a wireless communication hardware state, indicating whether the wireless communication hardware is to be in the doze state or in the awake state; and
   a wake up type, indicating a type of transmission expected to be received during the awake state.

7. The method of claim 1, wherein the at least one software layer above the driver comprises a transport driver.

8. A computer readable medium having computer executable instructions for, when executed by a processor, performing a method of conserving power consumed by wireless communication hardware, the method comprising:
   receiving a packet for transmission from higher level software comprising a software layer above the interface and the wireless communication hardware;
   receiving scheduling related information through an interface for the wireless communication hardware from a plurality of sources comprising the software layer above the interface and the wireless communication hardware along with the packet for transmission, wherein the scheduling related information can be used to determine an expected response time for receiving an expected response related to the packet for transmission, and wherein the driver comprises a data structure;
   receiving information on at least one reoccurring event through interaction with at least one other wireless computing device;
   transmitting the packet for transmission using the wireless communication hardware;
   scheduling an awake state of the wireless communication hardware at a plurality of times by entering into the data structure a time value for each of the plurality of times, the plurality of time values comprising a time value based on the at least one reoccurring event and a time value based on the expected response time;
   placing the wireless communication hardware into a doze state; and during the doze state, processing entries of the data structure at predetermined time intervals, wherein the processing comprises:
    determining whether an entry in the data structure indicates a time of a scheduled awake state matching a current time, and
    when the processed entry in the data structure indicates a time of a scheduled awake state matching a current time, placing the wireless communication hardware into the awake state at the scheduled time.

9. The computer readable medium of claim 8, wherein the data structure comprises a timer array and wherein scheduling the awake state at a time of the plurality of times comprises: entering scheduling information on the awake state comprising an awake indicator into the timer array at a distance from a beginning of the time array corresponding to the scheduled time.

10. The computer readable medium of claim 8, wherein the time value for scheduling the awake state based on the expected response time comprises a time value based on the expected response time and a safety margin.

11. The computer readable medium of claim 9, wherein the scheduling information comprises:
    a wireless communication hardware state, indicating whether the wireless communication hardware is to be in the doze state or in the awake state; and
    a wake up type, indicating a type of transmission expected to be received during the awake state.

12. The computer readable medium of claim 9, wherein the method further comprises:
    maintaining the timer array;
    processing an entry of the timer array; and
    placing the wireless communication hardware into the awake state if the processed entry of the timer array indicated that the wireless communication hardware was to be in the awake state.

13. The computer readable medium of claim 8, wherein software layer above the interface comprises a transport driver.

14. The computer readable medium of claim 12, further comprising computer executable instructions for: placing the wireless communication hardware into a doze state if a transmission expected to be received during the awake state was received.

15. A timer mechanism in a driver for wireless communication hardware for implementing, when processed by a processor, a power conservation schedule for the wireless communication hardware, the timer mechanism comprising:
    a series of sequentially processed entries, wherein an entry of the series of sequentially processed entries comprises a state field for indicating an expected state of the wireless communication hardware and, when the expected state is an awake state, a wake up type field for indicating a type of transmission expected to be received during the awake state of the wireless communication hardware, and wherein further the series of sequentially processed entries are used to schedule the awake state of the wireless communication hardware using scheduling related information comprising information received by the driver from a plurality of sources comprising at least one software layer above the driver and the wireless communication hardware and information received by the driver through interaction with at least one other wireless communication device, wherein:
    the information from the plurality of sources comprising the at least one software layer above the driver and the wireless communication hardware comprises an expected response time related to a packet for transmission received along with the scheduling related information,
    the information received by the driver through interaction with the at least one other wireless communication device comprises at least one reoccurring event,
    the awake state is scheduled, at a plurality of times, based on the expected response time and a reoccurring event time of the reoccurring event, and
    during a doze state of the wireless communication hardware, entries of the series of sequentially processed entries are processed to determine whether an entry in the series of sequentially processed entries indicates a time value matching a current time, and, when the processed entry indicates a time value matching a current time, the wireless communication hardware is placed into the awake state.

16. The timer mechanism of claim 15, wherein the scheduling related information comprises information received with a packet for transmission and used to determine the expected response time.

17. The timer mechanism of claim 15, wherein processing an entry of the sequentially processed entries comprises: placing the wireless communication hardware into the awake state if the state field of the processed entry indicated that the expected state of the wireless communication hardware was the awake state.

18. The timer mechanism of claim 15, wherein processing an entry of the sequentially processed entries comprises: setting the state field of a later entry of the sequentially processed entries to indicate that the expected state of the wireless communication hardware is the awake state and setting the wake up type field of the later entry to indicate that transmission is associated with a reoccurring event, the setting the state field and the setting the wake up type field being performed if the wake up type field of the processed entry indicated that the transmission is associated with the reoccurring event, and wherein the later entry is selected based on an interval of the reoccurring event.

19. The timer mechanism of claim 15, wherein the wireless communication hardware is in a doze state unless the wireless communication hardware is transmitting data or is indicated to be in the awake state by the state field of a currently processed entry of the series of sequentially processed entries.

20. The timer mechanism of claim 15, wherein the timer mechanism is a timer array.

* * * * *